(12) United States Patent
Le et al.

(10) Patent No.: US 8,885,295 B2
(45) Date of Patent: Nov. 11, 2014

(54) UNDULATING DISK CLAMP

(71) Applicant: Seagate Technology LLC, Cupertino, CA (US)

(72) Inventors: Lynn Bich-Quy Le, San Jose, CA (US); Hans Leuthold, Santa Cruz, CA (US); Troy M. Herndon, San Jose, CA (US); Paco Gregor Flores, Felton, CA (US); Matthew M. McConnell, Scotts Valley, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/853,885

(22) Filed: Mar. 29, 2013

(65) Prior Publication Data

US 2014/0293479 A1    Oct. 2, 2014

(51) Int. Cl.
*G11B 17/02* (2006.01)
*G11B 17/028* (2006.01)

(52) U.S. Cl.
CPC .................. *G11B 17/0284* (2013.01)
USPC ....................................... 360/99.12

(58) Field of Classification Search
CPC ....................................... G11B 17/038
USPC .............. 360/98.08, 99.05, 99.12; 369/30.95, 369/30.96; 720/604, 605, 706–714
See application file for complete search history.

(56) References Cited

U.S. PATENT DOCUMENTS

| | | | |
|---|---|---|---|
| 6,282,054 B1 * | 8/2001 | Luo | 360/98.08 |
| 6,417,988 B1 | 7/2002 | Renken et al. | |
| 7,379,267 B2 | 5/2008 | Engesser et al. | |
| 7,823,270 B2 | 11/2010 | Choo et al. | |
| 8,069,554 B2 | 12/2011 | Ruden et al. | |
| 2005/0174684 A1 * | 8/2005 | Hanssen | 360/99.12 |

* cited by examiner

*Primary Examiner* — Adam R Giesy
*Assistant Examiner* — Gustavo Polo

(57) ABSTRACT

Provided herein is an apparatus, including a plurality of teeth extending from an outer perimeter of an annular disk clamp to an inner perimeter of the annular disk clamp and an annular groove in an outer perimeter of a hub, wherein the plurality of teeth do not engage the annular groove of the hub when the disk clamp is locked into an unlocked form, and wherein the plurality of teeth engage the annular groove of the hub when the annular disk clamp is locked into a locked form, clamping at least one disk onto the hub at a mounting point for the at least one disk.

20 Claims, 2 Drawing Sheets

UNDULATING DISK CLAMP

BACKGROUND

A hard disk drive ("HDD") includes one or more disks for storing digital data, which one or more disks are clamped to a spindle motor assembly for rotation during read-write operations. The conventional, screw-based disk clamp that is used to clamp the one or more disks to the spindle motor assembly requires a dedicated space for the clamp and the one or more screws used to fasten the disks to the spindle motor assembly. The height of the dedicated space required for the screw-based disk clamp takes an amount of length away from the bearing span of the spindle.

SUMMARY

Provided herein is an apparatus, including a plurality of teeth extending from an outer perimeter of an annular disk clamp to an inner perimeter of the annular disk clamp and an annular groove in an outer perimeter of a hub, wherein the plurality of teeth do not engage the annular groove of the hub when the disk clamp is unlocked into an unlocked form, and wherein the plurality of teeth engage the annular groove of the hub when the annular disk clamp is locked into a locked form, clamping at least one disk onto the hub at a mounting point for the at least one disk.

These and other aspects and features of the invention may be better understood with reference to the following drawings, description, and appended claims.

DRAWINGS

Figure 1A:
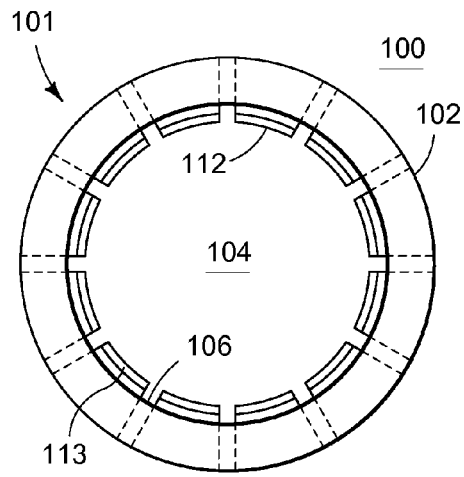

FIG. 1A provides a top view of a disk clamp in accordance with an embodiment.

Figure 1B:
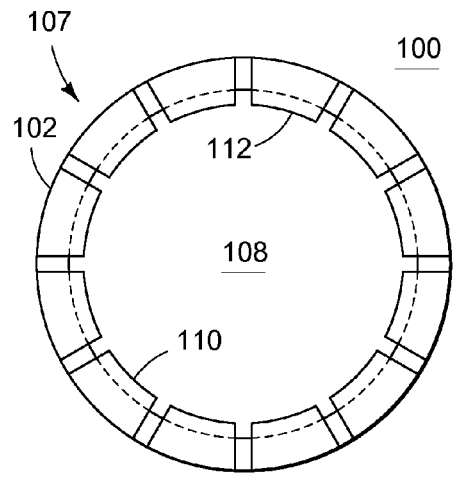

FIG. 1B provides a bottom view of a disk clamp in accordance with an embodiment.

Figure 2A:
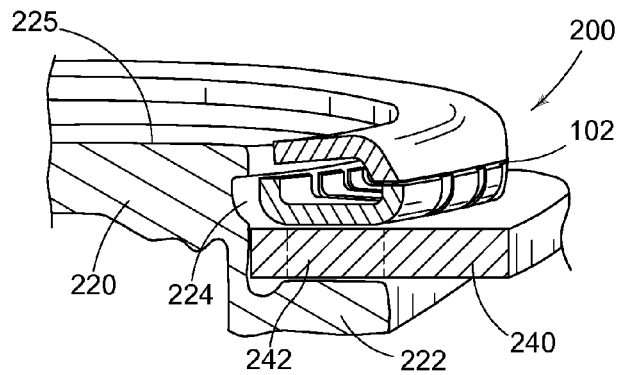

FIG. 2A provides a disk clamp prior to clamping a disk onto a hub in accordance with an embodiment.

Figure 2B:
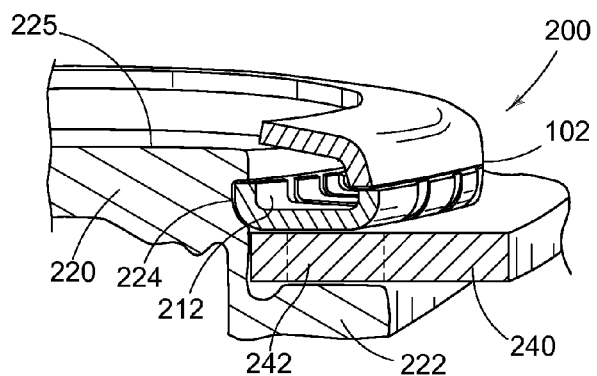

FIG. 2B provides a disk clamp clamping a disk onto a hub in accordance with an embodiment.

Figure 3:
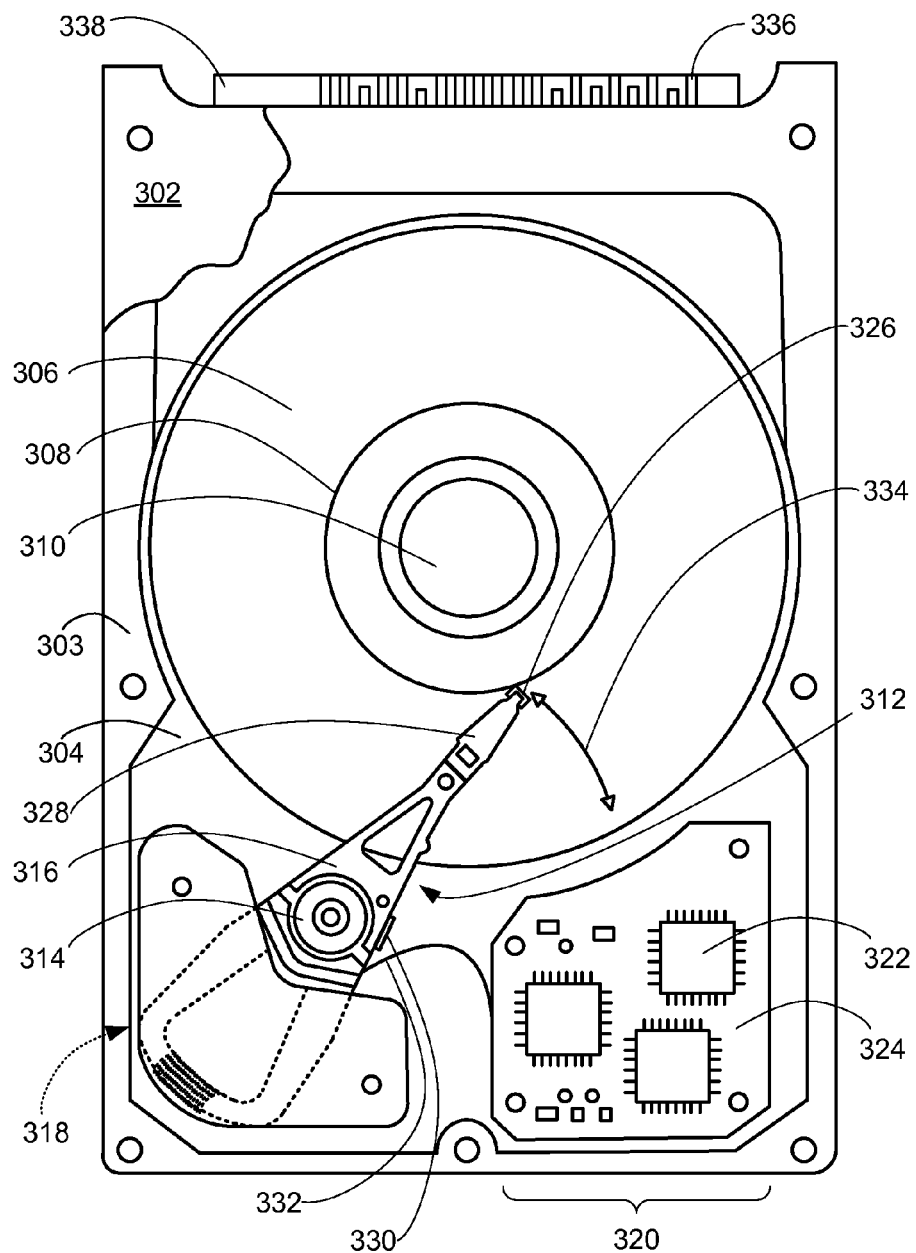

FIG. 3 provides a conventional HDD in which embodiments of one or more disk clamps may be used.

DESCRIPTION

Before embodiments of the invention are described in greater detail, it should be understood by persons having ordinary skill in the art to which the invention pertains that the invention is not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art to which the invention pertains that the terminology used herein is for the purpose of describing embodiments of the invention, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the claimed invention, or embodiments thereof. For example, "first," "second," and "third" elements or steps need not necessarily appear in that order, and the claimed invention, or embodiments thereof, need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the invention pertains.

Embodiments of the invention will now be described in greater detail.

Conventional HDDs (e.g., FIG. 3 and accompanying description herein below) typically include one or more data storage disks supported on a hub for rotation by a spindle motor assembly. The one or more data storage disks each have a central opening defining an inner diameter through which a spindle of the spindle motor assembly extends. Each disk is secured at its inner diameter to the hub in a fixed relation with the spindle, and each disk is supported such that its outer diameter is free from contact with other components. When the spindle is rotatably driven by the spindle motor, the one or more data storage disks rotate with the spindle.

In securing the one or more data storage disks to the hub, the disks are alternately stacked with spacer rings on the hub, defining the core of the disk stack. The disks of the disk stack are typically secured onto the hub by a disk clamp that fits over the top of the hub. Conventional HDDs typically use a screw-based disk clamp to secure the one or more data storage disks of the disk pack in place on the hub. The height of the dedicated space required for the screw-based disk clamp takes an amount of length away from the bearing span of the spindle, height that could instead be used to increase bearing span and, thus, gyro performance. Described herein are various embodiments of disk clamps that do not require screws and/or reclaim height-based space increasing bearing span.

In some embodiments, a disk clamp in accordance with FIG. 1A and FIG. 1B is provided to secure one or more disks onto a hub without a separate fastener (e.g., screw). The disk clamp 100 of FIG. 1A and FIG. 1B may comprise a material having a relatively low thermal expansion coefficient. In some embodiments, the disk clamp may comprise a material having a relatively low thermal expansion coefficient from about 5° C. to about 60° C., the normal operating range for HDDs. In such embodiments, the disk clamp may comprise aluminum or steel. Plastic may also be used as a material for the disk clamp.

As shown in FIG. 1A, which provides a top view of the disk clamp in an unlocked form, the disk clamp may be an annular disk clamp 100 with a top portion 101 comprising an outer perimeter 102, an inner opening 104 of the top portion, and an inner perimeter 106 of the inner opening of the top portion. As shown in FIG. 1B, which provides a bottom view of the disk clamp in a unlocked form, the disk clamp may be an annular disk clamp 100 with a bottom portion 107 comprising an outer perimeter 102 (shared with the top portion of the disk clamp [i.e., the top portion and the bottom portion of the disk clamp are connected at the outer perimeter]), an inner opening 108 of the bottom portion, and an inner perimeter 110 of the inner opening of the bottom portion.

As shown in both FIG. 1A and FIG. 1B, the bottom portion of the disk clamp 100 comprises a plurality of teeth 112, each with a lip 113, extending from the outer perimeter 102 of the disk clamp and terminating at the inner perimeter 110 of the inner opening of the bottom portion. The teeth, which are configured to occupy an annular groove of a hub, may be evenly spaced about the bottom portion of the disk clamp. In some embodiments, the disk clamp comprises an even number of teeth. In some embodiments, the disk clamp comprises an odd number of teeth. In some embodiments, the disk clamp comprises at least 3, 4, 5, 6, 7, 8, 9, 10, 11, or 12 teeth, or more, such as at least 24, 36, 48 or 60 teeth. As shown in the bottom view of the disk clamp (FIG. 1B), the top portion of the disk clamp is visible in the space between the teeth of the bottom portion of the disk clamp. Furthermore, FIG. 1B shows that the inner perimeter 106 of the inner opening of the top portion of the disk clamp is greater than the inner perimeter 110 of the inner opening of the bottom portion of the disk clamp.

The disk clamp 100 of FIG. 1A and FIG. 1B is shown in position in FIG. 2A in an unlocked form and in position in FIG. 2B in a locked form, securing a disk 240 onto a hub 220 without a separate fastener (e.g., screw). As shown in FIG. 2A, the hub comprises an annular groove 224 operable to accommodate the teeth 112 of the disk clamp (as shown in FIG. 2B), which annular groove is located in an outer perimeter of the hub, above a mounting point 222 for the disk, and below the topmost portion 225 of the hub 220.

The bottom portion of the disk clamp comprising the plurality of teeth 112 may be fitted over the topmost portion 225 of hub when the disk clamp is in the unlocked form shown in FIG. 2A. The top portion of the disk clamp may be angled toward and in relatively close proximity to the bottom portion of the disk clamp when the disk clamp is in the unlocked form. In addition, the top portion of the disk clamp may be taller than the bottom portion of the disk clamp; that is, the top portion of the disk clamp may be more than half the height of the disk clamp, while the bottom portion of the disk clamp may be less than half the height of the disk clamp.

The bottom portion of the disk clamp comprising the plurality of teeth 112 may not be fitted over the topmost portion 225 of hub when the disk clamp is in the locked form. In the locked form, the inner perimeter 110 of the inner opening of the bottom portion is less than the inner perimeter 110 of the inner opening of the bottom portion when the disk clamp is in the unlocked form. And in the locked form, the inner perimeter 110 of the inner opening of the bottom portion of the disk clamp is less than the outer perimeter of the hub making it difficult to fit the disk clamp over the hub without the risk of generating particles. When in position on the hub, the plurality of teeth of the bottom portion of the disk clamp occupy the annular groove of the hub as shown in FIG. 2B, as well as contact an inner annulus 242 of the disk, clamping the disk to the hub at the mounting point. The top portion of the disk clamp may be angled away from the bottom portion of the disk clamp and no longer in relatively close proximity to the bottom portion of the disk clamp when the disk clamp is in the locked form. In addition, the height of the disk clamp in the locked position may be more than the height of the disk clamp in the unlocked position.

The clamping action of the disk clamp is related to the phenomenon of "oil canning," which describes the tendency of a thin, flat sheet to undulate (or "snap") about the average plane of the flat sheet. Such thin, flat sheets may be said to act as diaphragms. With this concept in mind, the disk clamp in the unlocked form (e.g., with the top portion of the disk clamp angled toward and in relatively close proximity to the bottom portion of the disk clamp) may be "snapped" into the locked form (e.g., with the top portion of the disk clamp angled away from the bottom portion of the disk clamp and no longer in relatively close proximity to the bottom portion of the disk clamp) by moving the top portion of the disk clamp from a position below its average plane, through its average plane, and to a position above the average plane. In moving or "snapping" the top portion of the disk clamp from its position in the unlocked form to its position in the locked form, the top portion of the disk clamp may be temporarily deformed, which is resisted by the top portion of the disk clamp due to a build-up of hoop stress. The bottom portion of the disk clamp does not significantly resist being deformed due to the plurality of teeth (and voids), which break the hoop stress the bottom portion of the disk clamp would otherwise experience. When in position, "snapping" the disk clamp from the unlocked form into the locked form moves the plurality of teeth into the annular groove of the hub, clamping one or more disks to the hub.

With respect to the unclamping action of the disk clamp, the disk clamp in the locked form (e.g., with the top portion of the disk clamp angled away from the bottom portion of the disk clamp and no longer in relatively close proximity to the bottom portion of the disk clamp) may be "snapped" into the unlocked form (e.g., with the top portion of the disk clamp angled toward and in relatively close proximity to the bottom portion of the disk clamp) by moving the top portion of the disk clamp from a position above its average plane, through its average plane, and to a position below the average plane. In moving or "snapping" the top portion of the disk clamp from its position in the locked form to its position in the unlocked form, the top portion of the disk clamp may be temporarily deformed, which is resisted by the top portion of the disk clamp due to a build-up of hoop stress. The bottom portion of the disk clamp does not significantly resist being deformed due to the plurality of teeth (and voids), which break the hoop stress the bottom portion of the disk clamp would otherwise experience. When in position, "snapping" the disk clamp from the locked form into the unlocked form removes the plurality of teeth from the annular groove of the hub, unclamping one or more disks from the hub.

To provide for the "oil-canning" action of the disk clamp, the material should be of a light gauge. The strength of the clamping action may be adjusted by adjusting the gauge of the material used to make the clamp. In some embodiments, the disk clamp has a relatively thick gauge, but just light enough to allow for installation and/or removal of the disk clamp by means of its oil-canning action. In some embodiments, the disk clamp has a relatively light gauge, but just heavy enough to securely clamp one or more disks to a hub. In some embodiments, a top portion of the disk clamp is a lighter gauge than a bottom portion of the disk clamp. In some embodiments, the top portion and the bottom portion of the disk clamp have the same gauge.

With respect to installation (or removal), a tool configured to interface with the disk clamp of FIG. 1A and FIG. 2B may be operable to pick up the disk clamp, put the disk clamp onto the hub, and/or lock/unlock the disk clamp by pressing/depressing (i.e., "snapping") the top portion of the disk clamp.

With respect to clamping a disk to a hub using the disk clamp of FIGS. 1A, 1B, 2A, and/or 2B, such clamping comprises, in some embodiments, lowering the disk to be clamped over the topmost portion of the hub and onto the mounting point of the hub; lowering the disk clamp over the topmost portion of the hub and onto an inner annulus of a disk; and pressing the top portion of the disk clamp, inserting the teeth of the bottom portion of the disk clamp in the annular groove of the hub, and clamping the disk to the hub at the mounting point. With respect to unclamping and removing a disk from a hub, such unclamping and removing comprises, in some embodiments, depressing the top portion of the disk clamp, drawing the teeth of the bottom portion of the disk clamp from the annular groove of the hub, and unclamping the disk from the hub; raising the disk clamp over the topmost portion of the hub to remove the disk clamp; and raising the disk over the topmost portion of the hub to remove the disk.

FIG. 3 is a plan view of a hard disk drive 300, which hard disk drive may use the a disk clamp described herein. Hard disk drive 300 may include a housing assembly comprising a cover 302 that mates with a base deck having a frame 303 and a floor 304, which housing assembly provides a protective space for various hard disk drive components. The hard disk drive 300 includes one or more data storage disks 306 of computer-readable data storage media. Typically, both of the major surfaces of each data storage disk 306 include a plurality of concentrically disposed tracks for data storage purposes. Each data storage disk 306 is mounted on a hub 308, which in turn is rotatably interconnected with the base deck and/or cover 302. Multiple data storage disks 306 are typically mounted in vertically spaced and parallel relation on the hub 308. A spindle motor assembly 310 rotates the data storage disks 306.

The hard disk drive 300 also includes an actuator arm assembly 312 that pivots about a pivot bearing 314, which in turn is rotatably supported by the base deck and/or cover 302. The actuator arm assembly 312 includes one or more individual rigid actuator arms 316 that extend out from near the pivot bearing 314. Multiple actuator arms 316 are typically disposed in vertically spaced relation, with one actuator arm 316 being provided for each major data storage surface of each data storage disk 306 of the hard disk drive 300. Other types of actuator arm assembly configurations could be utilized as well, an example being an "E" block having one or more rigid actuator arm tips, or the like, that cantilever from a common structure. Movement of the actuator arm assembly 312 is provided by an actuator arm drive assembly, such as a voice coil motor 318 or the like. The voice coil motor 318 is a magnetic assembly that controls the operation of the actuator arm assembly 312 under the direction of control electronics 320. The control electronics 320 may include a plurality of integrated circuits 322 coupled to a printed circuit board 324. The control electronics 320 may be coupled to the voice coil motor assembly 318, a slider 326, or the spindle motor assembly 310 using interconnects that can include pins, cables, or wires (not shown).

A load beam or suspension 328 is attached to the free end of each actuator arm 316 and cantilevers therefrom. Typically, the suspension 328 is biased generally toward its corresponding data storage disk 306 by a spring-like force. The slider 326 is disposed at or near the free end of each suspension 328. What is commonly referred to as the read-write head (e.g., transducer) is appropriately mounted as a head unit (not shown) under the slider 326 and is used in hard disk drive read/write operations. The head unit under the slider 326 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 326 is connected to a preamplifier 330, which is interconnected with the control electronics 320 of the hard disk drive 300 by a flex cable 332 that is typically mounted on the actuator arm assembly 312. Signals are exchanged between the head unit and its corresponding data storage disk 306 for hard disk drive read/write operations. In this regard, the voice coil motor 318 is utilized to pivot the actuator arm assembly 312 to simultaneously move the slider 326 along a path 334 and across the corresponding data storage disk 306 to position the head unit at the appropriate position on the data storage disk 306 for hard disk drive read/write operations.

When the hard disk drive 300 is not in operation, the actuator arm assembly 312 is pivoted to a "parked position" to dispose each slider 326 generally at or beyond a perimeter of its corresponding data storage disk 306, but in any case in vertically spaced relation to its corresponding data storage disk 306. In this regard, the hard disk drive 300 includes a ramp assembly (not shown) that is disposed beyond a perimeter of the data storage disk 306 to both move the corresponding slider 326 vertically away from its corresponding data storage disk 306 and to also exert somewhat of a retaining force on the actuator arm assembly 312.

Exposed contacts 336 of a drive connector 338 along a side end of the hard disk drive 300 may be used to provide connectivity between circuitry of the hard disk drive 300 and a next level of integration such as an interposer, a circuit board, a cable connector, or an electronic assembly. The drive connector 338 may include jumpers (not shown) or switches (not shown) that may be used to configure the hard disk drive 300 for user specific features or configurations. The jumpers or switches may be recessed and exposed from within the drive connector 338.

As such, provided herein is an apparatus, comprising an outer perimeter connecting a top portion and a bottom portion of an annular disk clamp; a plurality of teeth extending from the outer perimeter of the annular disk clamp to an inner perimeter of the bottom portion; and an annular groove in an outer perimeter of a hub; wherein the plurality of teeth engage the annular groove of the hub when the annular disk clamp is locked into a locked form, clamping at least one disk onto the hub at a mounting point for the at least one disk, and wherein the plurality of teeth disengage the annular groove of the hub when the disk clamp is unlocked into an unlocked form, expanding the inner perimeter of the bottom portion and allowing the disk clamp to fit over the outer perimeter of the hub. In some embodiments, the top portion of the annular disk clamp comprises an inner perimeter. In some embodiments, the inner perimeter of the top portion of the annular disk clamp fits over the outer perimeter of the hub when the annular disk clamp is in the unlocked form. In some embodiments, the inner perimeter of the top portion of the annular disk clamp fits over the outer perimeter of the hub when the annular disk clamp is in the locked form. In some embodiments, the inner perimeter of the top portion of the annular disk clamp is greater than the inner perimeter of the bottom portion of the annular disk clamp. In some embodiments, the top portion and the bottom portion of the disk clamp are closer together when the disk clamp is in the unlocked form than when the annular disk clamp is in the locked form. In some embodiments, the disk clamp applies a uniform pressure on an inner annulus of the at least one disk directly overlying the mounting point.

Also provided herein is an apparatus, comprising an outer perimeter connecting a top portion and a bottom portion of an annular disk clamp; a plurality of teeth extending from the outer perimeter of the annular disk clamp to an inner perimeter of the bottom portion; and an annular groove in an outer perimeter of a hub; wherein the plurality of teeth do not occupy the annular groove of the hub when the disk clamp is in an unlocked form, wherein the annular groove of the hub is occupied by the plurality of teeth when the annular disk clamp is in a locked form, clamping at least one disk onto the hub at a mounting point for the at least one disk, and wherein the top portion and the bottom portion of the disk clamp are further apart when the disk clamp is in the locked form than when the disk clamp is in the unlocked form. In some embodiments, the top portion of the annular disk clamp comprises an inner perimeter. In some embodiments, the inner perimeter of the top portion of the annular disk clamp fits over the outer perimeter of the hub when the annular disk clamp is in the unlocked form. In some embodiments, the inner perimeter of the top portion of the annular disk clamp fits over the outer perimeter of the hub when the annular disk clamp is in the locked form. In some embodiments, the inner perimeter of the top portion of the annular disk clamp is greater than the inner perimeter of the bottom portion of the annular disk clamp. In some embodiments, the disk clamp applies a uniform pressure on an inner annulus of the at least one disk directly overlying the mounting point.

Also provided herein is an apparatus, comprising a plurality of teeth extending from an outer perimeter of an annular disk clamp to an inner perimeter of the annular disk clamp and an annular groove in an outer perimeter of a hub, wherein the plurality of teeth do not engage the annular groove of the hub when the disk clamp is unlocked into an unlocked form, and wherein the plurality of teeth engage the annular groove of the hub when the annular disk clamp is locked into a locked form, clamping at least one disk onto the hub at a mounting point for the at least one disk. In some embodiments, a top portion and a bottom portion of the annular disk clamp are closer together when the disk clamp is in the unlocked form than when the annular disk clamp is in the locked form. In some embodiments, an inner perimeter of a top portion of the annular disk clamp fits over the outer perimeter of the hub when the annular disk clamp is in the unlocked form. In some embodiments, an inner perimeter of a top portion of the annular disk clamp fits over the outer perimeter of the hub when the annular disk clamp is in the locked form. In some embodiments, an inner perimeter of a top portion of the annular disk clamp is greater than the inner perimeter to which the plurality of teeth extend. In some embodiments, the annular disk clamp applies a uniform pressure on an inner annulus of the at least one disk directly overlying the mounting point.

While the invention has been described and/or illustrated by means of various embodiments and/or examples, and while these embodiments and/or examples have been described in considerable detail, it is not the intention of the applicant(s) to restrict or in any way limit the scope of the invention to such detail. Additional adaptations and/or modifications of embodiments of the invention may readily appear to persons having ordinary skill in the art to which the invention pertains, and, in its broader aspects, the invention may encompass these adaptations and/or modifications. Accordingly, departures may be made from the foregoing embodiments and/or examples without departing from the scope of the invention, which scope is limited only by the following claims when appropriately construed.

What is claimed is:

1. An apparatus, comprising:
   an outer perimeter connecting a top portion and a bottom portion of an annular disk clamp; and
   a plurality of teeth extending from the outer perimeter of the disk clamp to an inner perimeter of the bottom portion,
      wherein the plurality of teeth are operable to engage an annular groove of a hub when the disk clamp is undulated into a locked form for clamping at least one disk onto the hub at a mounting point for the at least one disk, and
      wherein the plurality of teeth are operable to disengage an annular groove of a hub when the disk clamp is undulated into an unlocked form for expanding the inner perimeter of the bottom portion and allowing the disk clamp to fit over an outer perimeter of the hub.

2. The apparatus of claim 1, wherein an inner perimeter of the top portion of the disk clamp fits over an outer perimeter of a hub when the disk clamp is in the locked or unlocked form.

3. The apparatus of claim 1, wherein an inner perimeter of the top portion of the disk clamp is greater than the inner perimeter of the bottom portion of the disk clamp.

4. The apparatus of claim 1, wherein the top portion and the bottom portion of the disk clamp are closer together when the disk clamp is in the unlocked form than when the disk clamp is in the locked form.

5. The apparatus of claim 1, wherein the disk clamp is operable to apply a uniform pressure on an inner annulus of at least one disk directly overlying a mounting point on a hub for the at least one disk.

6. An apparatus, comprising:
   an outer perimeter connecting a top portion and a bottom portion of an annular disk clamp;
   a plurality of teeth extending from the outer perimeter of the disk clamp to an inner perimeter of the bottom portion
      wherein the plurality of teeth are operable to not occupy an annular groove of a hub when the disk clamp is undulated into an unlocked form,
      wherein the plurality of teeth are operable to occupy an annular groove of a hub when the disk clamp is undulated into a locked form for clamping at least one disk onto the hub at a mounting point for the at least one disk, and
      wherein the top portion and the bottom portion of the disk clamp are farther apart when the disk clamp is in the locked form than when the disk clamp is in the unlocked form.

7. The apparatus of claim 6, wherein an inner perimeter of the top portion of the disk clamp fits over an outer perimeter of a hub when the disk clamp is in the locked or unlocked form.

8. The apparatus of claim 6, wherein an inner perimeter of the top portion of the disk clamp is greater than the inner perimeter of the bottom portion of the disk clamp.

9. The apparatus of claim 6, wherein the disk clamp is operable to apply a uniform pressure on an inner annulus of at least one disk directly overlying a mounting point on a hub for the at least one disk.

10. An apparatus, comprising:
    a plurality of teeth extending from an outer perimeter of an annular disk clamp to an inner perimeter of the disk clamp,
       wherein the plurality of teeth are operable to not engage an annular groove of a hub when the disk clamp is undulated into an unlocked form, and
       wherein the plurality of teeth are operable to engage an annular groove of a hub when the disk clamp is undulated into a locked form for clamping at least one disk onto the hub at a mounting point for the at least one disk.

11. The apparatus of claim 10, wherein a top portion of the disk clamp is angled toward a bottom portion of the disk clamp when the disk clamp is in the unlocked form.

12. The apparatus of claim 10, wherein an inner perimeter of a top portion of the disk clamp fits over an outer perimeter of a hub when the disk clamp is in the locked or unlocked form.

13. The apparatus of claim 10, wherein an inner perimeter of a top portion of the disk clamp is greater than the inner perimeter to which the plurality of teeth extend.

14. The apparatus of claim 10, wherein the disk clamp is operable to apply a uniform pressure on an inner annulus of at least one disk directly overlying a mounting point on a hub for the at least one disk.

15. The apparatus of claim 1, wherein the disk clamp is configured for oil canning, and wherein the oil canning allows the disk clamp to be undulated from one of the locked form or the unlocked form into the other one of the locked form or the unlocked form.

16. The apparatus of claim 6, wherein the disk clamp is configured for oil canning, and wherein the oil canning allows the disk clamp to be undulated from one of the locked form or the unlocked form into the other one of the locked form or the unlocked form.

17. The apparatus of claim 10, wherein the disk clamp is configured for oil canning, and wherein the oil canning allows the disk clamp to be undulated from one of the locked form or the unlocked form into the other one of the locked form or the unlocked form.

18. The apparatus of claim 17, wherein the disk clamp has a gauge light enough for oil canning-based installation and removal of the disk clamp, and wherein the disk clamp has a gauge heavy enough to securely clamp at least one disk on a hub for the at least one disk.

19. The apparatus of claim 10, wherein a top portion of the disk clamp is angled away from a bottom portion of the disk clamp when the disk clamp is in the locked form.

20. The apparatus of claim 10, wherein a top portion of the disk clamp resists deformation due to hoop stress, and wherein a bottom portion of the disk clamp does not resist deformation due to the plurality of teeth and a plurality of voids respectively therebetween that break the hoop stress.

* * * * *